US008421945B2

(12) United States Patent
Lee

(10) Patent No.: US 8,421,945 B2
(45) Date of Patent: Apr. 16, 2013

(54) LIQUID CRYSTAL DISPLAY DEVICE

(75) Inventor: Kwang-Sae Lee, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 237 days.

(21) Appl. No.: 12/950,886

(22) Filed: Nov. 19, 2010

(65) Prior Publication Data

US 2011/0221983 A1 Sep. 15, 2011

(30) Foreign Application Priority Data

Mar. 11, 2010 (KR) ........................ 10-2010-0021813

(51) Int. Cl.
*G02F 1/1333* (2006.01)

(52) U.S. Cl.
USPC ............................................... 349/54; 349/34

(58) Field of Classification Search .................... 349/54, 349/33, 41, 43, 149, 34
See application file for complete search history.

(56) References Cited

U.S. PATENT DOCUMENTS 7,202,880 B2 * 4/2007 Takahashi ..................... 345/690
2007/0024560 A1 2/2007 Kim et al.

FOREIGN PATENT DOCUMENTS

KR 10-2008-0034542 4/2008
KR 10-2008-0054658 6/2008
KR 10-2009-0063689 A 6/2009

OTHER PUBLICATIONS

The Korean Office action issued by Korean Patent Office on Jul. 15, 2011, corresponding to KR 10-2010-0021813 and Request for Entry attached herewith.
Korean Notice of Allowance issued on Mar. 2, 2012 in connection with Korean Patent Application Serial No. 10-2010-0021813 and Request for Entry of the Accompanying Office Action attached herewith.

* cited by examiner

*Primary Examiner* — Thoi Duong
(74) *Attorney, Agent, or Firm* — Robert E. Bushnell, Esq.

(57) ABSTRACT

A liquid crystal display device includes a liquid crystal display panel having a plurality of pixels; a detector included in an interior of the liquid crystal display panel for detecting a variance of a kickback voltage; and a compensation common voltage generator reflects the variance of the kickback voltage detected by the detector and controls a common voltage to be supplied to the liquid crystal display panel. The detector includes at least one or more detection pixels, and the detection pixels are electrically connected to a gate line arranged in the liquid crystal display panel and to a detection line which is arranged neighboring to the data line disposed close to the edge of the liquid crystal display panel.

20 Claims, 6 Drawing Sheets

LIQUID CRYSTAL DISPLAY DEVICE

CLAIM OF PRIORITY

This application makes reference to, incorporates the same herein, and claims all benefits accruing under 35 U.S.C. §119 from an application earlier filed in the Korean Intellectual Property Office on the 11 of Mar. 2010 and there duly assigned Serial No. 10-2010-0021813.

BACKGROUND OF THE INVENTION

1. Field of the Invention

An embodiment of the present invention relates to a liquid crystal display device, and more particularly, to a liquid crystal display device that minimizes degradation of quality of images displayed caused by a kick back voltage.

2. Discussion of Related Art

The liquid crystal display device is a flat plane display device for displaying images by controlling a light transmittance of a liquid crystal by using an electric field. The liquid crystal display device may include a liquid crystal display panel in which liquid crystal cells are arranged in a matrix, and a driving circuit which drives the liquid crystal display panel.

SUMMARY OF THE INVENTION

One embodiment of the present invention is to provide a liquid crystal display device that minimizes degradation of quality of images displayed caused by a kickback voltage, and the minimization of degradation of quality of images displayed may be achieved by detecting a variance of the kickback voltage, and by reflecting the variance of the kickback voltage in a common voltage.

In accordance with one aspect of the present invention, a liquid crystal display device minimizes degradation of quality images displayed, i.e., a flicker and an image sticking caused by the kickback voltage, by optimizing a common voltage per a liquid crystal display panel by reflecting a variance of the kickback voltage in the common voltage in order to compensate for such variance of the kickback voltage. Such variance of the kickback voltage may be generated during a process of manufacturing the liquid crystal display device. In accordance with embodiments of the present invention, such variance of the kickback voltage may be detected in the liquid crystal panel without employing an additional system and without consuming additional process time.

In accordance with one embodiment of the present invention, a liquid crystal display device may include a liquid crystal display panel having a plurality of pixels; a detector disposed within an interior of the liquid crystal display panel and the detector detecting a variance of a kickback voltage; and a compensation common voltage generator controlling a common voltage supplied to the liquid crystal display panel by adjusting the common voltage in accordance with the variance of the kickback voltage detected by the detector. The detector may include at least one detection pixel, with the detection pixel being electrically connected to a gate line arranged within the liquid crystal display panel and being electrically connected to a detection line arranged neighboring to a data line which is disposed closest to an edge of the liquid crystal display panel among a plurality of data lines.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
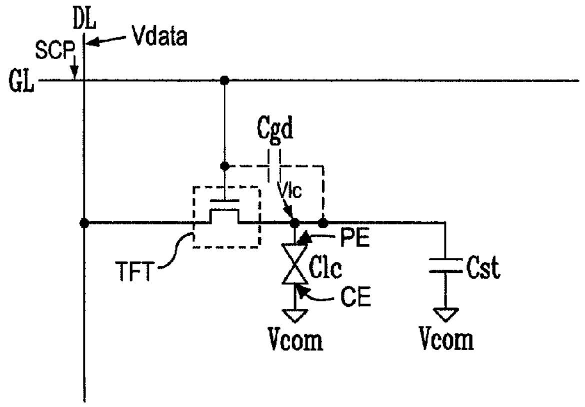
FIG. 1 is a schematic circuit diagram showing a pixel included in a liquid crystal display panel.

Hereinafter, certain exemplary embodiments of the present invention will be described with reference to the accompanying drawings. Here, when a first element is described as being coupled to a second element, the first element may be directly coupled to the second element, and may be indirectly coupled to the second element via a third element. Further, some of the elements that are not essential to the complete understanding of the invention may be omitted for clarity. Also, like reference numerals refer to like elements throughout.

FIG. 1 is a schematic circuit diagram showing a pixel included in a liquid crystal display panel.

With reference to FIG. 1, the liquid crystal display panel includes a gate line (GL) and a data line (DL) that are intersected with each other, and a thin film transistor (TFT) driving the liquid crystal cells (Clc). The thin film transistor (TFT) may be geometrically formed at the intersection between the gate line (GL) and the data line (DL). In addition, the liquid crystal display panel includes a storage capacitor (Cst) maintaining a voltage applied to the liquid crystal cells (Clc). In some cases, the gate electrode of TFT may be electrically connected to the gate line GL, one of the source and drain electrodes of TFT may be electrically connected to the data line DL, and the other one of the source and drain electrodes of TFT may be electrically connected to the liquid crystal cells (Clc) and to one terminal of the storage capacitor (Cst).

The liquid crystal cell (Clc) may include a pixel electrode PE, a common electrode CE, and a liquid crystal layer imposed between the pixel electrode and the common electrode. The liquid crystal cells (Clc) may control the amount of light passing through the liquid crystal cells and may cut off the light by changing the arrangement of liquid crystal molecules by controlling the electric voltage potential (Vlc) actually supplied to the pixel electrode while a data voltage (Vdata) is transmitted to the pixel electrode and a common voltage (Vcom) is supplied to the common electrode. The voltage difference between the pixel electrode and the common electrode is applied to a liquid crystal layer of the liquid crystal cells. The data signal voltage has a value of a predetermined gamma voltage suitable for driving the liquid crystal cells (Clc).

Figure 2:
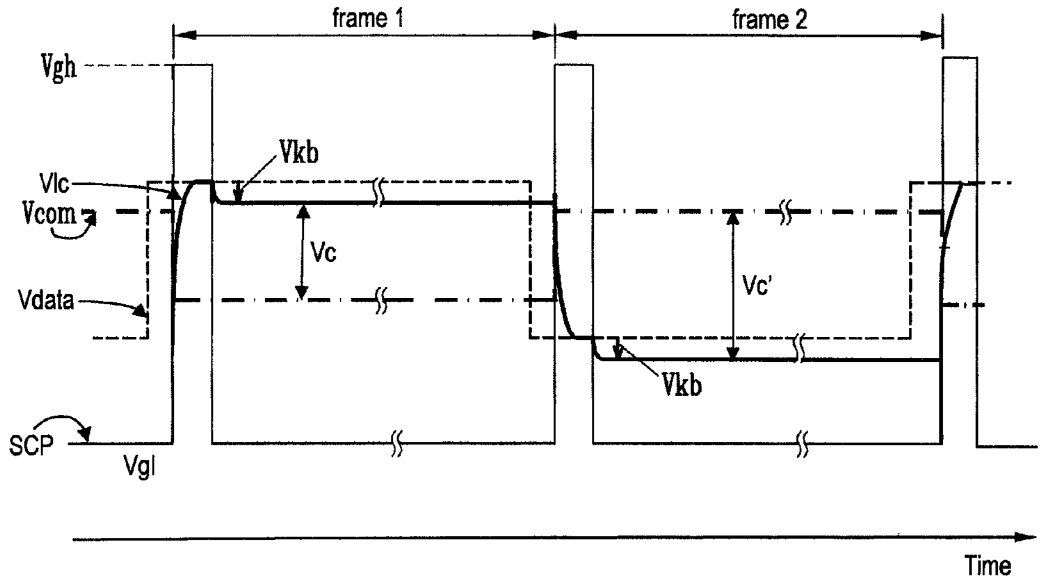
FIG. 2 is a waveform diagram showing a group of waveforms generated during driving a pixel as depicted in FIG. 1.

FIG. 2 is a waveform diagram showing driving voltages driving a pixel as depicted in FIG. 1. The waveforms of FIG. 2 show the voltage (Vlc) actually supplied to the pixel electrode PE of the liquid crystal cell (Clc), the common voltage (Vcom) being transmitted to the common electrode CE of the liquid crystal cell (Clc) and a scanning signal (SCP) being supplied to the gate line (GL).

With reference to FIG. 2, the scanning signal (SCP) swings between a gate high voltage (Vgh) determined as a turn-on voltage for turning on the TFT, and a gate low voltage (Vgl) determined as a turn-off voltage for turning off the TFT.

During a certain period of time within a scanning period, the scanning signal (SCP) maintains the gate voltage as Vgh and turns on the TFT, the liquid crystal cell (Clc) is charged with a data signal (Vdata) supplied as the gamma voltage, and the charged voltage may be maintained by being stored in a storage capacity (Cst).

The quality of images displayed and the characteristic of the liquid crystal may degrade because of a continuous application of a driving voltage (e.g., the data signal) maintaining a single polarity, therefore, the liquid crystal cells may be driven by using an AC data signal (Vdata) which periodically reverses the polarity of the data signal. In some cases, the data signal (Vdata) may have a positive polarity in a certain period of time, and then have a negative polarity in the next period of time.

The method of driving the reversal as discussed above may be achieved by a way of a frame inversion, a line inversion, a dot inversion, and the like, and in the case of the frame inversion, for example, a polarity of the data signal (Vdata) per a frame may be reversed. A frame may refer to a repeating period of the scanning signal (SCP).

As shown in FIG. 2, the common voltage (Vcom) may be supplied as a voltage having a constant absolute voltage value while having an alternating polarity. The common voltage (Vcom) may have a polarity opposite to the polarity of the date signal (Vdata).

The kickback voltage (Vkb) may be generated as a voltage difference between voltage potential (Vlc) which is actually supplied to the pixel electrode and the data signal (Vdata) which is transmitted to the pixel electrode of the liquid crystal cells (Clc).

The kickback voltage (Vkb) generated by a parasitic capacitance (Cgd) of TFT may act as a key factor of degrading image quality in the liquid crystal display device, and the kickback voltage (Vkb) may be defined as the following [Equation 1]:

$$Vkb = \frac{Cgd}{Cgd + Clc + Cst}(Vgh - Vgl) \quad \text{[Equation 1]}$$

In Equation 1, Cgd indicates a parasitic capacitance formed between the gate electrode of TFT connected to the gate line GL and the drain electrode. In addition, Clc indicates a capacitance of the liquid crystal cells, and Cst indicates the capacitance of the storage capacitor.

The data signal (Vdata) being transmitted to the pixel electrode of the liquid crystal cells is disadvantageously altered by the kickback voltage (Vkb), therefore, a flicker and image sticking may occur to images displayed. For example, when the polarity of the date signal (Vdata) is reversed at a frequency of 60 Hz, flicker will occur to the images displayed at a frequency of 30 Hz due to the generation of a brightness difference between an odd frame and an even frame. The brightness difference between the odd frame and the even frame may be caused by the voltage difference between Vc and Vc' as shown in FIG. 2. Vc and Vc' both refer to voltage applied to the liquid crystal layer of the liquid crystal cells (Clc). Vc refers to the voltage difference between voltage Vlc and the common voltage Vcom in frame 1, and Vc' refers to the voltage difference between voltage Vlc and the common voltage Vcom in frame 2. The kickback voltage Vkb generates the difference between Vc and Vc', therefore, the brightness difference between frame 1 and frame 2 is generated by the kickback voltage Vkb. When the liquid crystal display device operates in this condition for a long time period, the characteristic of transmission of voltages in the liquid crystal cells may be disadvantageously shifted and image sticking may occur to images displayed because of DC voltage offset applied to the liquid crystal cells.

In order to solve the problems caused by the kickback voltage (Vkb), a pre-calculated kickback voltage to be generated may be reflected in the data signal (Vdata), however, such pre-calculated kickback voltage does not reflect a variance caused by design errors generated by the manufacturing process of TFT substrate.

The embodiments of the present invention will now be described in detail with reference to the accompanying drawings as follows.

Figure 3:
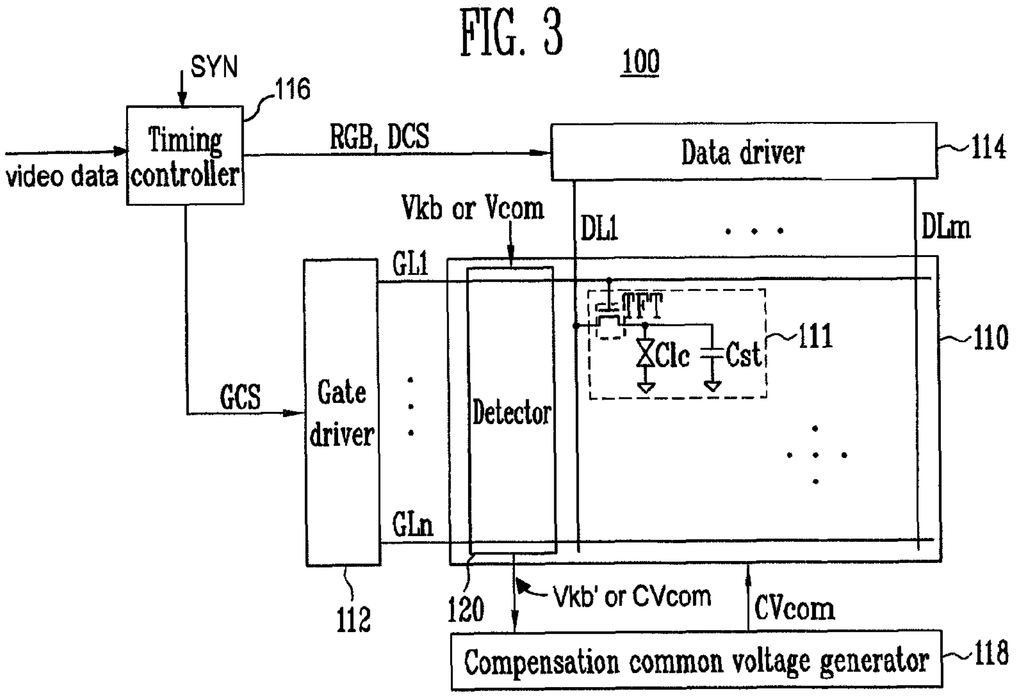
FIG. 3 is a block diagram showing a configuration of the liquid crystal display device constructed as the principles of an embodiment of the present invention.

FIG. 3 is a block diagram showing a configuration of the liquid crystal display device in accordance with one embodiment of the present invention.

With reference to FIG. 3, the liquid crystal display device 100 constructed as the principles of one embodiment of the present invention may have a liquid crystal display panel 110 including a plurality of pixels 111, a data driver 114 supplying a data signal to data lines (DL1 to DLm) of the liquid crystal display panel 110, a gate driver 112 for supplying a scanning signal to gate lines (GL1 to GLn), a timing controller 116 controlling the data driver 114 and the gate driver 112 by using a synchronization signal SYN supplied from an exterior, a detector 120 detecting a variance of the kickback voltage, and a compensation common voltage generator 118 reflecting the variance of the kickback voltage detected by the detector 120. In an embodiment, the detector 120 may be included within the interior of the liquid crystal display panel 110.

The timing controller 116 may re-arrange a digital video data (RGB) inputted from an exterior of the liquid crystal display device 100, for example, from a graphic controller of a system, and the timing controller 116 supplies the digital video data (RGB) to the data driver 114. In addition, the timing controller 116 generates a data control signal (DCS) for controlling the data driver 114 and a gate control signal (GCS) for controlling the gate driver 112.

At this time, the gate control signal (GCS) for controlling the gate driver 112 may include a gate start pulse (GSP), a gate shift clock (GSC), a gate output enable (GOE), and the like.

In addition, the date control signal (DCS) for controlling the date driver 114 may include a source start pulse (SSP), a source shift clock (SSC), a source output enable (SOE), a polarity (POL), and the like.

The data driver 114 responds to the data control signal (DCS) transmitted from the timing controller 116, changes the digital video data (R, G, B) into an analog gamma voltage corresponding to a gray scale, and then supplies the analog gamma voltage to the data lines (DL1 to DLm).

In addition, the gate driver 112 responds to the gate control signal (GCS) transmitted from the timing controller 116 by supplying successive scanning signal to the gate lines (GL1 to GLn). According to the above process, the gate driver 112 may control and drive the thin film transistors (TFTs) by supplying scanning signal to the gate electrodes of the TFTs via the gate lines (GL1 to GLn).

A plurality of pixels 111 included in the liquid crystal display panel 110 may be arranged in a matrix and be geometrically disposed at the intersections of the gate lines (GL1 to GLn) and the data lines (DL1 to DLm), and each pixel 111 may include a liquid crystal cell (Clc) and a thin film transistor (TFT), and a storage capacitor (Cst). In an embodiment, the gate electrode of TFT is electrically connected to the gate line, one of the source and drain electrodes of TFT is electrically connected to the data line, and the other one of the source and drain electrodes of TFT is electrically connected to the liquid crystal cell (Clc) and to one terminal of the storage capacitor (Cst).

As previously discussed, the flicker and image sticking may occur to images displayed because the data signal actually supplied to the pixel electrode of the liquid crystal cells is disadvantageously altered by the kickback voltage (Vkb) generated by the parasitic capacitance (Cgd) of the thin film transistor included in the each pixel 111.

In addition, variance of the parasitic capacitance of the thin film transistor may cause the variance of the kickback voltage. The variance of the parasitic capacitance (Cgd) of the thin film transistor may be disadvantageously generated during the manufacture of the liquid crystal display panel. During the manufacture of the liquid crystal display panel, the variance of the parasitic capacitance (Cgd) of the thin film transistor may be caused by variance of the thicknesses of films included in the thin film transistor and by misalignment between the films of the thin film transistor.

A liquid crystal display device constructed as an embodiment of the present invention is therefore provided in order to solve the problems caused by the variance of the kickback voltage. In accordance with the embodiment of the present invention, the liquid crystal display device may include the detector 120 compensating for the common voltage by detecting the variance of the kickback voltage generated by the variance of the parasitic capacitance of the thin film transistor, and by reflecting the variance of the kickback voltage to the common voltage.

In other words, the embodiment of the present invention is to provide the liquid crystal display device including the detector 120 for detecting the variance of the kickback voltage. In one embodiment as shown in FIG. 3, the detector 120 may be included within the interior of the liquid crystal display panel 110.

As shown in FIG. 3, the detector 120 is configured to include at least one detection pixel (not shown) which is disposed among the pixels 111, and the detection pixel includes a thin film transistor and a storage capacitor implemented by the same process implementing the pixels 111.

The detection pixel may be electrically connected to a detection line neighboring to the data line (D1 or Dm) which is arranged at an end of the liquid crystal display panel and neighboring to at least one or more of the gate lines formed in the liquid crystal display panel.

The thin film transistor included in the detection pixel may be formed by using the same process manufacturing the thin film transistor included in other pixels 111 of the liquid crystal display panel, so that the variance of the parasitic capacitance of the thin film transistor included in the detection pixel is the same as the other pixels 111.

Therefore, the embodiment of the present invention is to detect the variance of the parasitic capacitance of the thin film transistor included in the pixel 111 of the liquid crystal display panel by detecting the variance of the parasitic capacitance of the thin film transistor of the detection pixel. In this embodiment, the detection pixel does not participate to display images.

In order to detect the variance of the parasitic capacitance of the thin film transistor, a pre-determined kickback voltage (Vkb) or a pre-determined common voltage (Vcom) may be supplied to a source electrode of the thin film transistor included in the detection pixel of the detector 120. In an embodiment, when the detector 120 has more than one detection pixel, the pre-determined kickback voltage (Vkb) or a pre-determined common voltage (Vcom) may be supplied to the source electrode of each thin film transistor included in each detection pixel of the detector 120. Accordingly, when the thin film transistor included in the detection pixel turns on, the voltage reflecting the variance of the thin film transistor may output to the drain electrode of this thin film transistor.

When the pre-determined kickback voltage is supplied to the source electrode of the thin film transistor of the detection pixel, the kickback voltage altered by the variance of the parasitic capacitance may be outputted to the drain electrode of this thin film transistor, therefore, the disadvantages caused by the variance of the kickback voltage may be overcome by controlling the common voltage supplied to the liquid crystal display panel by reflecting the variance of kickback voltage in the common voltage supplied.

In addition, when the pre-determined common voltage supplies to the source electrode of the thin film transistor, the common voltage may be altered by the variance of the parasitic capacitance. In other words, the common voltage may be adjusted to compensate for the variance of the parasitic capacitance and may reflect the variance of the kickback voltage. The common voltage may be outputted by the thin film transistor of the detection pixel, therefore, the disadvantages caused by the variance of the kickback voltage may be solved by supplying the adjusted common voltage to the liquid crystal display panel.

Figure 4:
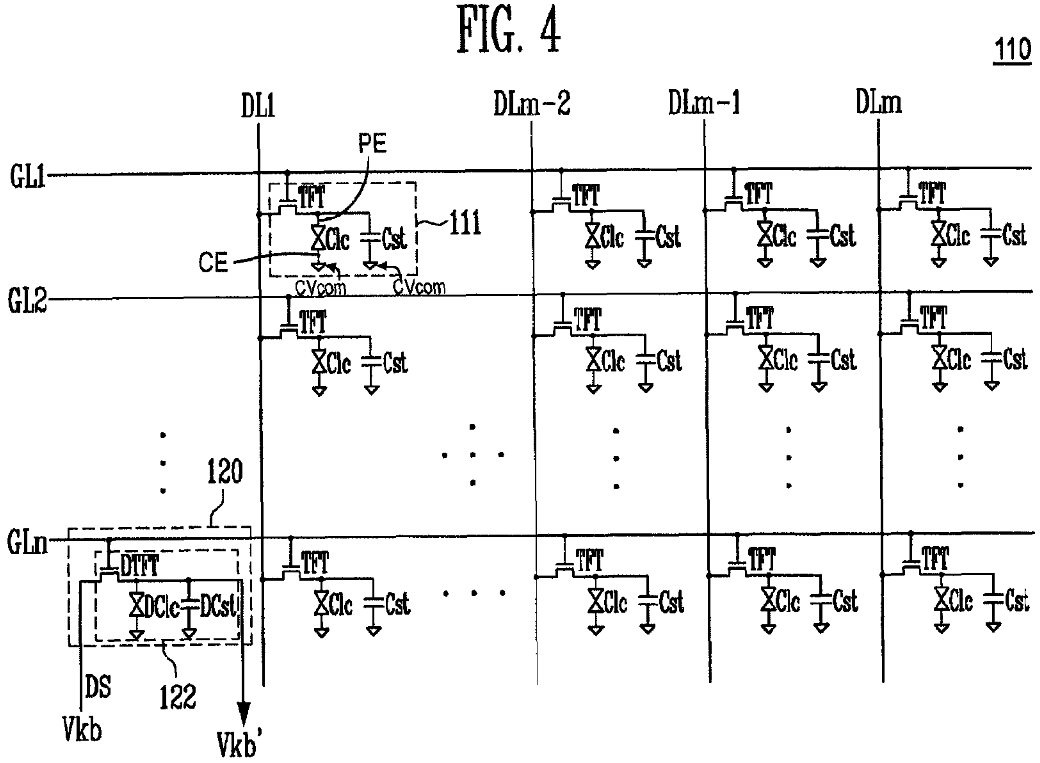
FIG. 4 is a circuit diagram showing a configuration of a liquid crystal display panel of FIG. 3 in accordance with the principles of another embodiment of the present invention.

FIG. 4 is a circuit diagram showing the configuration of the liquid crystal display panel 110 of FIG. 3 according to one embodiment of the present invention.

In the embodiment as shown in FIG. 4, the detector 120 may include one detection pixel 122, and this embodiment will be described as an example in which the pre-determined kickback voltage (Vkb) is supplied to the source electrode of the thin film transistor (DTFT) included in the detection pixel 122.

The present invention is however not limited to the embodiment as shown in FIG. 4, and may cover embodiments in which more than one detection pixel may be included in the detector 120.

With reference to FIG. 4, the liquid crystal display panel 110 includes a plurality of the pixels 111 arranged in a matrix, and each pixel 111 may be disposed at a corresponding intersection of each date line (one of DL1 through DLm) and each gate line (one of GL1 through GLn). Each pixel 111 may include a liquid crystal cell (Cls), a thin film transistor (TFT) connected with the liquid crystal cell, and a storage capacity (Cst).

The thin film transistor (TFT) is supplied by the pixel voltage signal transmitted from the data lines (DL1 through DLm) in response to a scan signal transmitted from the gate line (GL) and supplied to the gate electrode of the TFT. The storage capacity (Cst) constantly maintains the voltage charged in the liquid crystal cell (Clc).

As previously discussed, the flicker and image sticking may occur to the images displayed because the data signal to be supplied to the pixel electrode of the liquid crystal cell is altered by the kickback voltage (Vkb) generated by the parasitic capacitance (Cgd) of the thin film transistor included in the each pixel 111, and because the variance of kickback voltage may be irregularly generated in the liquid crystal display panel due to the variance of the parasitic capacitance of the thin film transistors included in the liquid crystal display panel.

The embodiment of the present invention may solve the disadvantages generated by the variance of the kickback voltage by reflecting the variance of the kickback voltage to the common voltage for compensation, in which the variance of the kickback voltage is generated by the variance of the parasitic capacitance of the thin film transistor.

In the embodiment of the present invention, the detector 120 included within the interior of the liquid crystal display panel 110 may detect the variance of the kickback voltage, and the detector 120 may include at least one detection pixel 122.

As shown in FIG. 4, the detection pixel 122 includes the storage capacity (DCst) and the thin film transistor (DTFT) implemented by the same process with the pixels 111 included in the liquid crystal display panel 110.

The detection pixel 122 is electrically connected to the detection line (DS) which is close to a data line (for example, first data line, DL1) arranged at one end of the liquid crystal display panel and close to a gate line (for example, n-th order of the gate lines, GLn) among the gate lines formed in the liquid crystal display panel.

More specifically, in the thin film transistor (DTFT) included in the detection pixel 122, the gate electrode of the thin film transistor (DTFT) is electrically connected to the n-th order of the gate line (GLn), and the source electrode of the thin film transistor is electrically connected to the detection line (DS). The drain electrode is electrically connected to one electrode of the storage capacity (DCst), and the voltage corresponding to the voltage inputted to the source electrode may be outputted to the drain electrode. In other words, a voltage Vkb' reflecting the variance of the parasitic capacitance of the thin film transistor (DTFT) may be outputted to the drain electrode.

At this time, the value of the pre-determined kickback voltage (Vkb) supplies to the detection line (DS), in which the value is pre-determined assuming that the kickback voltage is ideally constant.

Therefore, if the scan signal supplies to the n-th order of the gate line GLn, the thin film transistor (DTFT) included in the detection pixel 122 may turn on, so that the pre-determined kickback voltage (Vkb) may be supplied to the source electrode of DTFT via the detection line (DS) and may be outputted to the drain electrode of the thin film transistor. The voltage value outputted to the drain electrode may be the value of the kickback voltage (Vkb') varied by the variance of the parasitic capacitance of the thin film transistor.

As shown in FIG. 3, the outputted kickback voltage Vkb', i.e., the voltage value reflecting the variance of the parasitic capacitance of the thin film transistor is supplied to the compensation common voltage generator 118, and the compensation common voltage generator 118 supplies the adjusted common voltage (CVcom) reflecting the changed value of kickback voltage to the liquid crystal display panel 110. Here, the common voltage Vcom is adjusted by Vkb' and becomes the compensated common voltage (CVcom).

Figure 5:
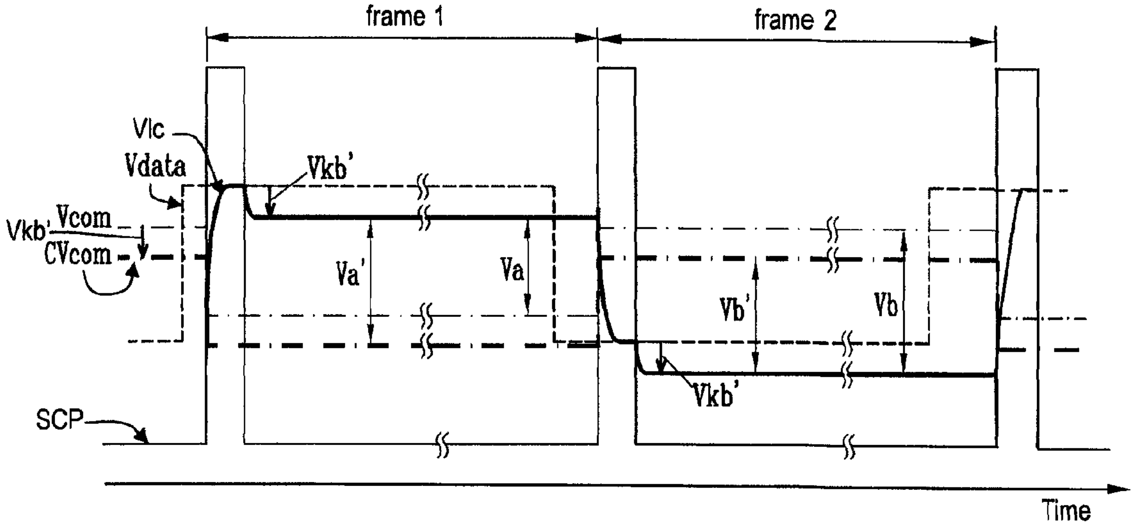
FIG. 5 is a waveform diagram showing a group of waveforms generated during driving a pixel as depicted in FIG. 4.

FIG. 5 is a waveform diagram showing a group of waveforms generated during driving a pixel as depicted in FIG. 4. As shown in FIG. 2, when the variance of the kickback voltage (Vkb') is generated, a balance of the amount of the charge generated by the voltage difference between the common voltage and data signal cannot be realized upon the reversion of the data signal, i.e., Va≠Vb.

In the embodiment of the present invention as shown in FIG. 5, however, the common voltage level may be controlled to have an adjusted voltage level reflecting the variance of the kickback voltage. When the reversed data signal according to each frame is provided, the balance of the amount of the charge generated by the voltage difference between the common voltage and data signal may be realized, i.e., Va'=Vb'. In other words, the voltages difference between the adjusted common voltage (CVcom) and the data voltage (Vdata) are substantially identical in each frame.

In accordance with the embodiment of the present invention, the flicker problems caused by the unbalance of the charge in an even frame and an odd frame, which are close with each other, may be solved.

Figure 6:
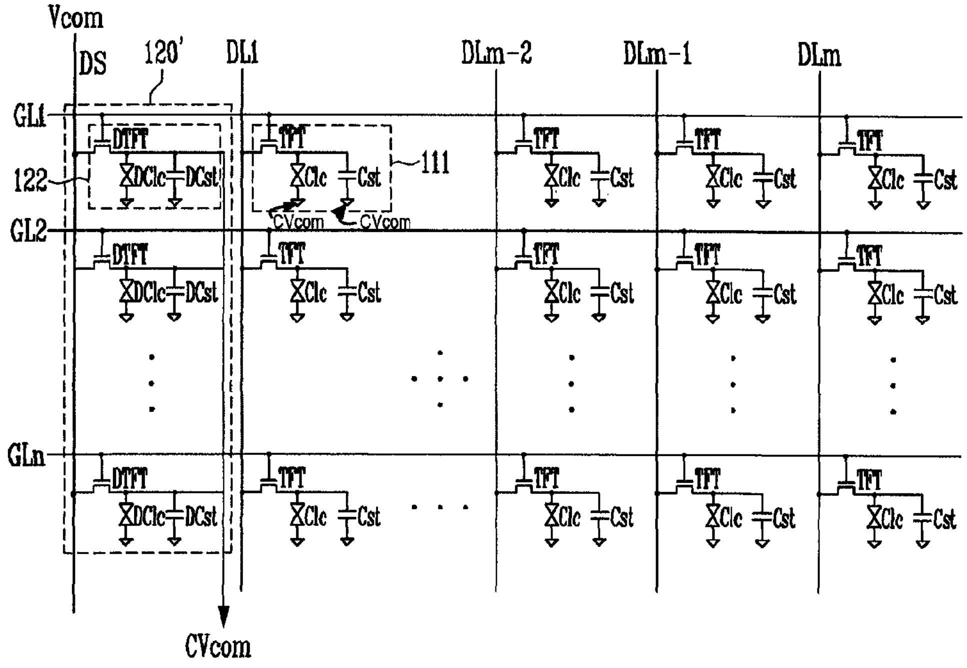
FIG. 6 is a circuit diagram showing a configuration of the liquid crystal display panel of FIG. 3 in accordance with still another embodiment.

FIG. 6 is a circuit diagram showing the configuration of the liquid crystal display panel of FIG. 3 constructed as another embodiment of the present invention.

The embodiment as depicted in FIG. 6 is that the detector 120' as depicted in FIG. 3 is configured with a plurality of the detection pixels 122, and will be described as an example in the case of supplying the pre-determined common voltage (Vcom) to the source electrode of the thin film transistor (DTFT) included in the detection pixel 122.

The configuration of the detector 120' as shown in FIG. 6 is different compared to FIG. 4, however, the pixels 111 of the liquid crystal display panel are the same. Therefore, the same element may use the same figure reference number and the detailed description of the pixels 111 will be omitted.

In the embodiment of the present invention as shown in FIG. 6, the detector 120' detects the variance of the kickback voltage, and the detector 120' is formed within the interior of the liquid crystal display panel 110. In the embodiment of the present invention, the detector 120' may include a plurality of the detection pixels 122.

In this embodiment, each detection pixel 122 may include a thin film transistor (DTFT) and a storage capacity (Cst) implemented by the same process as the pixels 111 included in the liquid crystal display panel.

The detection pixels 122 are electrically connected to the detection line (DS) close to the data line (for example, first data line, DL1) arranged at an end of the liquid crystal display panel and close to the plurality of the gate lines (GL1 to GLn) formed on the liquid crystal display panel.

More specifically, the thin film transistors (DTFTs) respectively included in the detection pixels 122 are respectively electrically connected to the gate lines (GL1 to GLn) corresponding to the gate electrodes. The source electrode of the DTFT is electrically connected to the detection line (DS), the drain electrode of the DTFT is electrically connected to one electrode of the storage capacity (DCst), and the voltage inputted to the source electrode of the DTFT may be outputted at the drain electrode of the DTFT. As previously discussed, when the voltage input from the source electrode is output to the drain electrode, the value of the voltage output to the drain electrode reflects the variance of the parasitic capacitance of the thin film transistor.

Accordingly, a pre-determined common voltage (Vcom) may be supplied to the detection line (DS).

According to the above process, when the scan signals are successively supplied to the gate lines, the thin film transistor (DTFT) included in the detection pixel 122 may turn on, so that the pre-determined common voltage (Vcom) supplied through the detection line (DS) may be outputted to the drain electrode of the DTFT through the source electrode of the thin film transistor (DTFT). Therefore, the voltage outputted to the drain electrode of the DTFT has a value of the adjusted common voltage (CVcom) according to the variance of the parasitic capacitance of the thin film transistor (DTFT).

Therefore, the output common voltage, i.e., the voltage value of the adjusted common voltage (CVcom) reflecting the variance of the parasitic capacitance is supplied to the compensation common voltage generator 118 as depicted in FIG. 3. The compensation common voltage generator 118 is supplied with the adjusted common voltage (CVcom) and supplies the adjusted common voltage (CVcom) as the compensation voltage to the liquid crystal display panel 110.

Figure 7:
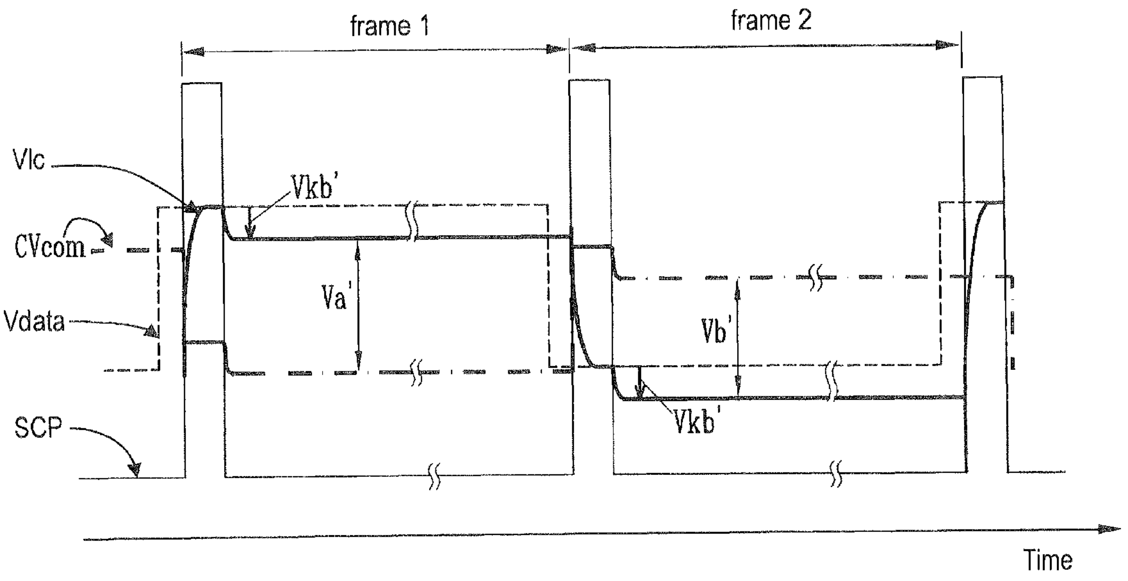
FIG. 7 is a waveform diagram showing a group of waveforms generated during driving a pixel as depicted in FIG. 6.

FIG. 7 is a waveform diagram showing a group of waveforms generated during driving a pixel as depicted in FIG. 6.

With reference to FIG. 7, the level of the common voltage is adjusted in accordance with the variance of the kickback voltage, and is controlled to have an adjusted common voltage value (CVcom). Therefore, the balance of the amount of the charge generated by the voltage difference between the common voltage and the data signal in each frame may be achieved (Va'=Vb'), while the reversed data signal is supplied according to each frame. In other words, the voltages difference between the adjusted common voltage (CVcom) and the data voltage (Vdata) are substantially identical in each frame. In accordance with the embodiment of the present invention, the flicker problems caused by the unbalance of the charge in an even frame and an odd frame, which are next to each other, may be solved.

Figure 8:
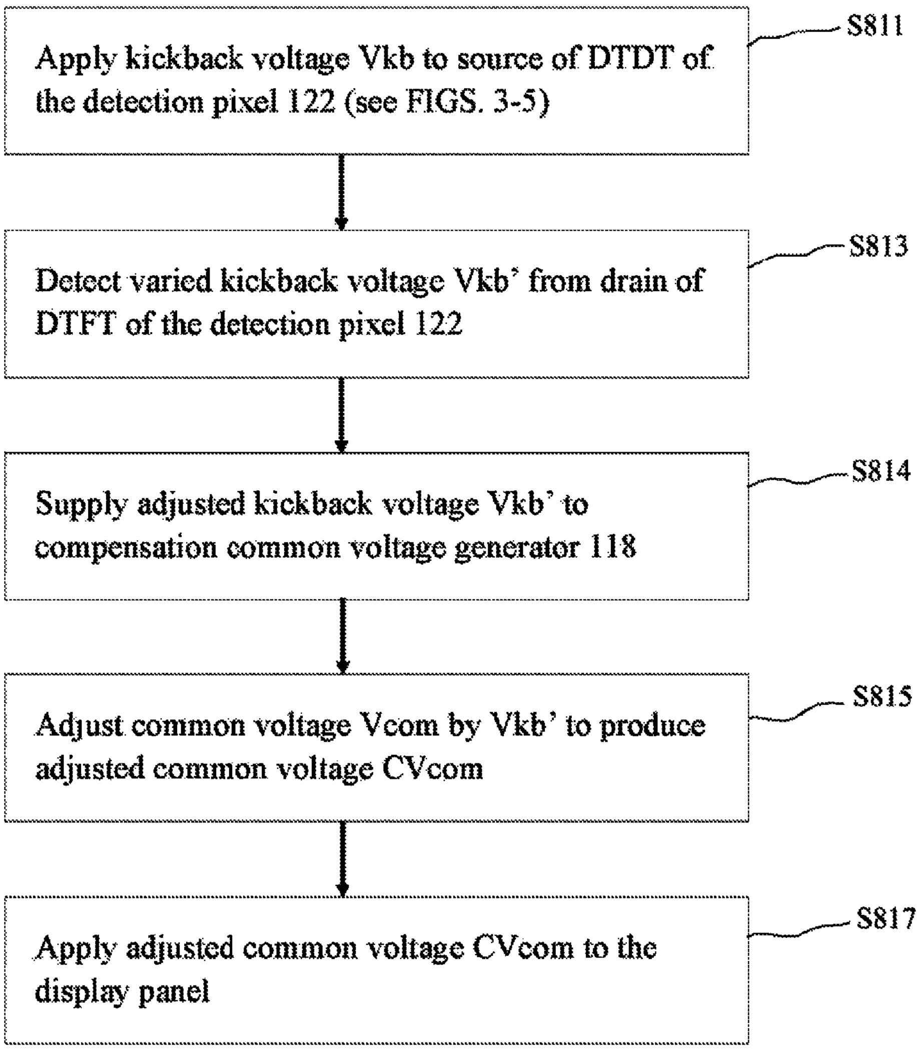
FIG. 8 is a flow chart showing a driving method realizing the voltage compensation for the common voltage as shown in FIGS. 4 and 5.

A driving method as shown in FIG. 8 may realize the voltage compensation for the common voltage Vcom as shown in FIGS. 4 and 5.

In step S811, a predetermined kickback voltage Vkb is applied to a source electrode of the thin film transistor DTFT included in the detection pixel 122. An actual kickback voltage Vkb' reflecting the variance of the parasitic capacitance of the thin film transistor (DTFT) is output to a drain electrode of DTFT (S813) and is supplied to the compensation common voltage generator 118 (S814). In step S815, the compensation common voltage generator 118 adjusts the common voltage (Vcom) by using the actual kickback voltage Vkb' detected. In step S817, the compensation common voltage generator 118 supplies the adjusted common voltage (CVcom) reflecting the changed value of kickback voltage to the liquid crystal display panel 110.

Figure 9:
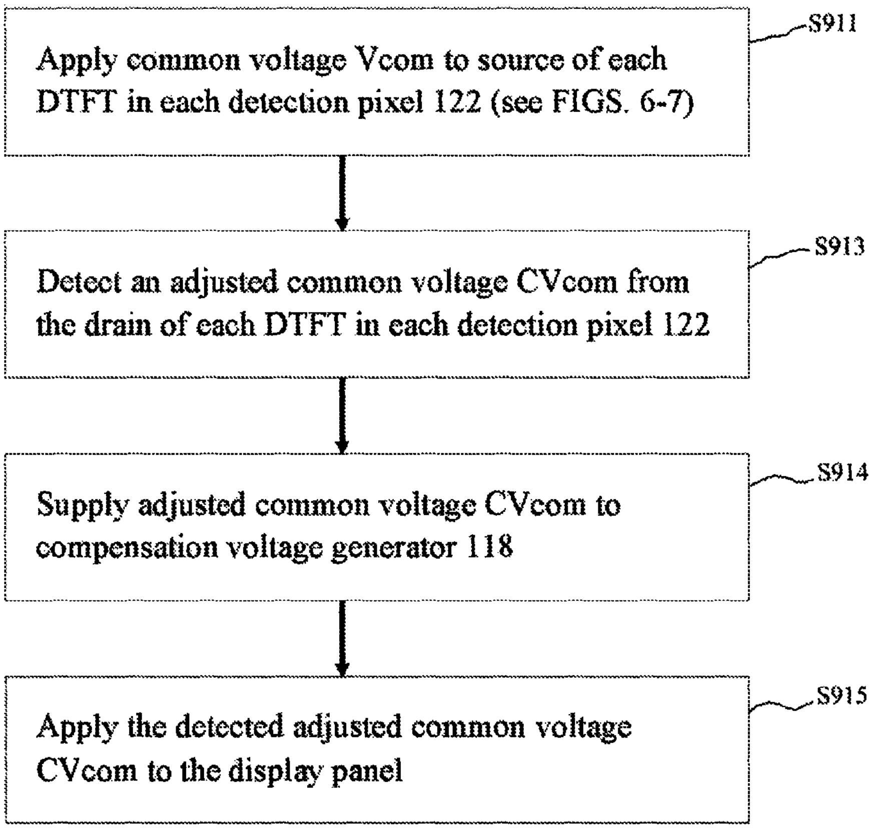
FIG. 9 is a flow chart showing a driving method realizing the voltage compensation for the common voltage as shown in FIGS. 6 and 7.

A driving method as shown in FIG. 9 may realize the voltage compensation for the common voltage Vcom as shown in FIGS. 6 and 7.

In step S911, a predetermined common voltage Vcom is applied to a source electrode of the thin film transistor DTFT included in the detection pixel 122. An adjusted common voltage CVcom reflecting the variance of the parasitic capacitance of the thin film transistor (DTFT) is output to a drain electrode of DTFT (S913) and is supplied to the compensation common voltage generator 118 (S914). In step S915, the compensation common voltage generator 118 supplies the adjusted common voltage (CVcom) reflecting the changed value of kickback voltage to the liquid crystal display panel 110.

While the present invention has been described in connection with certain exemplary embodiments, it is to be understood that the invention is not limited to the disclosed embodiments, but, on the contrary, is intended to cover various modifications and equivalent arrangements included within the sprit and scope of the appended claims, and equivalents thereof.

What is claimed is:

1. A liquid crystal display device, comprising:

a liquid crystal display panel having a plurality of pixels;

a detector disposed within an interior of the liquid crystal display panel and the detector detecting a variance of a kickback voltage, and the detector including at least one detection pixel, with the detection pixel being electrically connected to a gate line arranged within the liquid crystal display panel and being electrically connected to a detection line arranged neighboring to a data line which is disposed closest to an edge of the liquid crystal display panel among a plurality of data lines, wherein one of a pre-determined kickback voltage and a predetermined common voltage is applied to the detection line; and a compensation common voltage generator controlling a common voltage supplied to the liquid crystal display panel by adjusting the common voltage in accordance with the variance of the kickback voltage detected by the detector.

2. The liquid crystal display device as claimed in claim 1, wherein the detection pixel comprises a first thin film transistor implemented by a same process implementing second thin film transistors included in the plurality of pixels included in the liquid crystal display panel, wherein the pre-determined kickback voltage is applied to the detection line, the predetermined kickback voltage having a source other than a source for the data lines.

3. The liquid crystal display device as claimed in claim 2, wherein the detector is implemented by a plurality of detection pixels electrically connected to a plurality of gate lines and a plurality of detection lines.

4. The liquid crystal display device as claimed in claim 3, wherein each of the plurality of detection pixels comprises the first thin film transistor, a gate electrode of the first thin film transistor is electrically connected to one of the plurality of gate lines, a source electrode of the first thin film transistor is electrically connected to one of the plurality of detection lines, and a drain electrode of the first thin film transistor outputs a voltage to the compensation common voltage generator.

5. The liquid crystal display device as claimed in claim 3, wherein a pre-determined common voltage is supplied to the detection lines of the first thin film transistors.

6. The liquid crystal display device as claimed in claim 5, wherein the pre-determined common voltage has a polarity opposite from that of the data signal and is applied to a common electrode of liquid crystal cells of the thin film transistors in the liquid crystal display panel.

7. The liquid crystal display device as claimed in claim 1, wherein the detector comprises the detection pixel electrically connected to the detection line and to the gate line.

8. The liquid crystal display device as claimed in claim 7, wherein the detection line is the gate line neighboring to the edge of the liquid crystal display panel.

9. The liquid crystal display device as claimed in claim 7, wherein a gate electrode of the first thin film transistor is electrically connected to the gate line, a source electrode of the first thin film transistor is electrically connected to the detection line, and a drain electrode of the first thin film transistor outputs a voltage potential to the compensation common voltage generator.

10. The liquid crystal display device as claimed in claim 7, wherein the pre-determined kickback voltage is supplied to the detection line.

11. The liquid crystal display device as claimed in claim 10, wherein the pre-determined kickback voltage is a difference between a data signal applied to source electrodes of thin film transistors in the liquid crystal display panel and a pixel voltage at the drain electrodes of the thin film transistors in the liquid crystal display panel when an unadjusted common voltage is being applied to the liquid crystal display panel.

12. The liquid crystal display device of claim 1, the detector being composed of only one pixel and does not participate to display images, and wherein the pre-determined kickback voltage is a difference between a data signal applied to source electrodes of thin film transistors in the liquid crystal display panel and a pixel voltage at the drain electrodes of the thin film transistors in the liquid crystal display panel.

13. A liquid crystal display device, comprising:

a liquid crystal display panel having a plurality of display pixels which display images;

a detector disposed within an interior of the liquid crystal display panel and the detector including at least one detection pixel which is excluded from displaying the images, the detector receiving one of a predetermined kickback voltage and a predetermined common voltage and generating one of an altered kickback voltage and an altered common voltage each of which reflects a variance of a first thin film transistor included in the detection pixel; and a compensation common voltage generator controlling a common voltage supplied to the plurality of display pixels by adjusting the common voltage in accordance with one of the altered kickback voltage and the altered common voltage generated by the detector.

14. The liquid crystal display device of claim 13, wherein the detection pixel is electrically connected to a gate line arranged within the liquid crystal display panel and is electrically connected to a detection line arranged neighboring to a data line which is disposed closest to an edge of the liquid crystal display panel among a plurality of data lines.

15. The liquid crystal display device of claim 13, wherein the variance of the first thin film transistor included in the detection pixel reflects a variance of the second thin film transistors included in the plurality of display pixels.

16. The liquid crystal display device of claim 13, wherein the detection pixel comprises the first thin film transistor manufactured by an identical process making second thin film transistors included in the plurality of display pixels disposed within the liquid crystal display panel.

17. The liquid crystal display device of claim 13, the detector being composed of only one detection pixel and the detector receives the predetermined kickback voltage, the common voltage being adjusted by the altered kickback voltage to produce the altered common voltage.

18. A method of driving a liquid crystal display device, comprising steps of:

applying one of a predetermined kickback voltage and a predetermined common voltage to a detector of the liquid crystal display device, with the detector being disposed within an interior of the liquid crystal display panel and the detector including at least one detection pixel which is excluded from displaying the images;

generating, at the detector, one of an altered kickback voltage and an altered common voltage each of which reflects a variance of a first thin film transistor included in the detection pixel;

controlling, by a compensation common voltage generator, a common voltage applied to a liquid crystal display panel by adjusting the common voltage in accordance with one of the altered kickback voltage and the altered common voltage generated by the detector; and applying, by a compensation common voltage generator, the common voltage adjusted to the plurality of display pixels which display images.

19. The method of driving the liquid crystal display device of claim 18, wherein the variance of the first thin film transistor included in the detection pixel reflects a variance of second thin film transistors included in the plurality of display pixels.

20. The method of claim 18, the detector including only one detection pixel, the predetermined kickback voltage being applied to the detector, an altered kickback voltage being generated by the detector, wherein the predetermined kickback voltage is a difference between a data signal applied to source electrodes of thin film transistors used in pixels used to display images and a pixel voltage at the drain electrodes of the thin film transistors in the pixels used to display images.

* * * * *